United States Patent [19]
Machida

[11] Patent Number: 5,368,529
[45] Date of Patent: Nov. 29, 1994

[54] TOROIDAL TYPE CONTINUOUSLY VARIABLE TRANSMISSION

[75] Inventor: Hisashi Machida, Fujisawa, Japan
[73] Assignee: NSK Ltd., Tokyo, Japan
[21] Appl. No.: 70,939
[22] Filed: Jun. 4, 1993
[30] Foreign Application Priority Data
  Jun. 29, 1992 [JP] Japan ............... 4-050823[U]
  Jun. 29, 1992 [JP] Japan ............... 4-050824[U]
[51] Int. Cl.$^5$ ........................... F16H 15/38
[52] U.S. Cl. ........................... 476/42; 476/40
[58] Field of Search ........................... 476/40, 42

[56] References Cited
U.S. PATENT DOCUMENTS
  2,850,911  9/1958  Kraus ........................... 74/200
  3,299,744  1/1967  Kraus ........................... 74/720.5

FOREIGN PATENT DOCUMENTS
  62-75170  4/1987  Japan ........................... 476/40
  62-71465  5/1987  Japan .
  1-299358 12/1989  Japan ........................... 476/40
  2-163549  6/1990  Japan .
  3-2041    1/1991  Japan .
  2255142  10/1992  United Kingdom .

Primary Examiner—Allan D. Herrmann
Attorney, Agent, or Firm—Shapiro and Shapiro

[57] ABSTRACT

A toroidal type continuously variable transmission intended to prevent an increase in weight of the rear end portion when constructing a automobile transmission and restrain vibrations and noised during an operation. An input shaft is rotated by a crankshaft of an engine through a gear transmission mechanism provided at the front end. The rotations of this input shaft are transmitted to input disks via a driving gear, a driven gear, an external rotary cylinder, cam plates and rollers. Power rollers rotate with rotations of the input disks. The rotations of the power rollers are transmitted to an output shaft via output disks, whereby the output shaft is rotated.

2 Claims, 5 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission utilized as a transmission for, e.g., an automobile.

2. Related Background Art

There has been pursued the use of a toroidal type continuously variable transmission illustrated in FIGS. 2 and 3 as a transmission for an automobile. In this toroidal type continuously variable transmission, as disclosed in, e.g., Japanese Utility Model Laid-Open Application No. 62-71465, an input disk 2 is supported concentrically with an input shaft 1, and an output disk 4 is fixed to the end of an output shaft 3. A casing encases the toroidal type continuously variable transmission. A support bracket is provided on the inner surface of the casing or inwardly of this casing. The support bracket is provided with trunnions 5, 5 each swinging about a pivot disposed in a twist position with respect to the input shaft 1 and the output shaft 3 as well.

Each of the trunnions 5, 5 is composed of a metal material exhibiting a sufficient rigidity. The pivots are provided on the external surface at both ends thereof. Power rollers 7, 7 are rotatably supported on the peripheries of displacement shafts 6, 6 provided at the central parts of the respective trunnions 5. Each of the power rollers 7, 7 is interposed between the input and output disks 2, 4.

Inner surfaces 2a, 4a of the input and output disks 2, 4 are disposed in a face-to-face relationship and concaved in a circular arc in section, with the pivots being centered. Then, peripheral surfaces 7a, 7a of the power rollers 7, 7 are spherically convexed and come into contact with the inner surfaces 2a, 4a.

A loading cam type pressure unit 8 is interposed between the input shaft 1 and the input disk 2. This pressure unit 8 elastically thrusts the input disk 2 toward the output disk 4. The pressure unit 8 is constructed of a cam plate 9 rotating together with the input shaft 1 and a plurality (e.g., four pieces) of rollers 11, 11 held by a holder 10. A cam surface 12 concaved and convexed in the peripheral direction is formed on one surface (right surface in FIGS. 2 and 3) of the cam plate 9. Further, a similar cam surface 13 3) is formed on an external surface (left surface in FIGS. 2 and of the input disk 2. Then, the plurality of rollers 11, 11 are rotatable about the axes in the radial directions with the input shaft 1 being centered.

With rotations of the input shaft 1 constituting a part of the toroidal type continuously variable transmission described above, the cam plate 9 rotates. Then, a cam surface 12 presses a plurality of rollers 11, 11 against a cam surface 13 formed on the outer surface of the input disk 2. As a result, the input disk 2 is pressed against the plurality of power rollers 7, 7. Simultaneously, the input disk 2 rotates when the pair of cam surfaces 12, 13 engage with the plurality of rollers 11, 11. Then, the rotations of this input disk 2 are transmitted to the output disk 4 via the plurality of power rollers 7, 7. The output shaft 3 fixed to this output disk 4 is thereby rotated.

In the case of changing the ratio of revolutions between the input shaft 1 and the output shaft 3, when effecting at first a deceleration between the input shaft 1 and the output shaft 3, as illustrated in FIG. 2, the trunnions 5, 5 are swung about pivots. The displacement shafts 6, 6 are tilted so that the peripheral surfaces 7a, 7a of the power rollers 7, 7 are brought into contact with the closer-to-center part of the inner surface 2a of the input disk 2 and with the closer-to-outer-periphery part of the inner surface 4a of the output disk 4.

Reversely, when performing an acceleration, the trunnions 5, 5 are swung as shown in FIG. 3. The displacement shafts 6, 6 are tilted so that the peripheral surfaces 7a, 7a of the power rollers 7, 7 come into contact with the closer-to-outer-periphery part of the inner surface 2a of the input disk 2 and with the closer-to-center part of the inner surface 4a of the output disk 4.

Tilt angles of the displacement shafts 6, 6 are set intermediate between those shown in FIGS. 2 and 3, thereby obtaining an intermediate transmission gear ratio between the input shaft 1 and the output shaft 3.

Further, for enhancing the power transmittable by the toroidal type continuously variable transmission that is constructed and acts as described above, as disclosed in Japanese Patent Laid-Open Application No. 2-163549, the arrangement has hitherto been proposed, wherein a pair of toroidal type continuously transmissions shown in FIGS. 2 and 3 are disposed in tandem in the power transmitting direction. FIG. 4 illustrates a structure in which the pair of toroidal type continuously variable transmissions are disposed in tandem.

A needle bearing 22 is provided between the inner peripheral surface of one end (left end in FIG. 4) of a circular-tube torque transmission shaft 14 and the outer peripheral surface of the end of the input shaft 1. The torque transmission shaft 14 is disposed concentrically with the input shaft 1. The input shaft 1 and the torque transmission shaft 14 are rotatable independently of each other.

A pair of input disks 2, 2 spaced away from each other are provided on the periphery of the torque transmission shaft 14. Ball splines 15, 15 are formed between the inner peripheral edges of the input disks 2, 2 and an outer peripheral surfaces 14a of the torque transmission shaft 14. The input disks 2, 2 are so supported on the torque transmission shaft 14 as to be impossible of rotating about this torque transmission shaft 14 but shiftable in the axial directions (right-and-left directions in FIG. 4) of the torque transmission shaft 14. Further, inner surfaces 2a, 2a of the input disks 2, 2 are each concaved in a circular arc in section.

Moreover, a pair of output disks 4, 4 are so provided between the pair of input disks 2, 2 as to be rotatable about the torque transmission shaft 14 and shiftable in the axial directions thereof. Inner surfaces 4a, 4a (inner surfaces of the disks 2, 4 imply the side surfaces of the disks 2, 4 that are disposed in a face-to-face relationship with each other in this specification) are concaved in the circular arc in section.

A ring-like output gear 18 is provided between the output disks 4, 4. This output gear 18 is fixed to the outer peripheral surface of a mid-portion of a cylindrical sleeve 19. Then, this sleeve 19 is so supported on the outer peripheral surface of a mid-portion of the torque transmission shaft 14 as to be rotatable about the torque transmission shaft 14 and shiftable by a small quantity in the axial directions thereof. Further, the pair of output disks 4, 4 are spline-engaged with the outer peripheral surfaces of both ends of the sleeve 19.

The cam plate 9 is rotatably supported on one end of the torque transmission shaft 14 through a thrust ball bearing 16. This cam plate 9 is connected via a flange plate 17 to the input shaft 1 and thereby rotate integrally. Then, a plurality of rollers 11 rotatably held by a holder 10 are interposed between the cam surface 12 and the cam surface 13. The cam surface 12 is formed on the inner surface (right surface in FIG. 4) of the cam plate 9. The cam surface 13 is formed on the outer surface of one input disk 2 (left in FIG. 4). Constructed in this way is a pressure unit 8 for thrusting this one input disk 2 in such a direction as to get apart from the cam plate 9 in the axial direction of the torque transmission shaft 14.

Besides, a stopper 20 and a flat plate spring 21 are provided between the torque transmission shaft 14 and the other input disk 2 (right in FIG. 4) which does not face to the pressure unit 8. Constructed in this manner is a stopper means for restricting this input disk 2 from moving in such a direction as to get away from the pressure unit 8.

Furthermore, the trunnions 5 and the plurality of power rollers 7 are provided between the inner surfaces 2a, 2a of the pair of input disks 2, 2 and the inner surfaces 4a, 4a of the pair of output disks 4, 4. The trunnions are swung about the pivots existing in the twist positions with respect to the torque transmission shaft 14. The power rollers 7 have spherically concaved peripheral surfaces 7a and rotatably supported on the displacement shafts 6 retained by the trunnions 5. Then, the peripheral surfaces 7a of the power rollers 7 are brought into contact with the inner surfaces 2a, 4a of the input and output disks 2, 4 by dint of a pressing force of the pressure unit 8.

Based on the structure wherein the pair of toroidal type continuously variable transmissions constructed as mentioned above, a rotational torque inputted from the single input shaft 1 is transmitted to one input disk 2 via a flange plate 17, the cam plate 9 and the pressure unit 8. The input disk 2 rotates with the torque transmission shaft 14. Then, with the rotations of the torque transmission shaft 14, the other input disk 2 rotates in synchronization with one input disk 2.

The rotary motions of the pair of input disks 2, 2 rotating synchronously through the torque transmission shaft 14 are transmitted respectively via the plurality of power rollers 7 to the pair of output disks 4, 4. The sleeve 17 spline-engaged with the two output disks 4, 4 is thereby rotated. Subsequently, the rotary motion of this sleeve 19 is taken out by means of the output gear 18.

When incorporating the transmission into a front-engine rear drive vehicle, it is preferable that:

(1) the rear end of the crankshaft of the engine and the front end of the propeller shaft be located on substantially the same straight line; and (2) the components of the transmission be disposed substantially uniformly in the circumference of the straight line described above.

On the other hand, the pair of toroidal type continuously variable transmissions shown in FIG. 4 are disposed in tandem. In the case of this structure, it is impossible to, if left as it is, place the input shaft 1 connected to the crankshaft and the output shaft connected to the propeller shaft on the same straight line. Namely, a take-off shaft to which a gear meshing with the output gear is fixed inevitably deviates sideway from the line of extension of the input shaft 1 by a distance measured as a total of a radius of the output gear 18 and a radius of the above-mentioned gear. Consequently, if the take-off shaft is employed directly as an output shaft, it is impossible to locate the rear end of the crankshaft of the engine and the front end of the propeller shaft on the same straight line.

For this reason, as disclosed in Japanese Utility Model Publication No. 3-2041, the input shaft 1 and the output shaft are concentrically disposed. At the same time, the front end of this output shaft is connected via the gear to the rear end of the take-off shaft. More specifically, as illustrated in FIG. 5, two lengths of take-off shafts 23, 23 are disposed in parallel with the input shaft 1 in a side-by-side relationship. Simultaneously, gears 24, 24 fixed to the front ends of the take-off shafts 23, 23 mesh with the output gear 18.

On the other hand, gears 25, 25 fixed to the rear ends of the take-off shafts 23, 23 mesh with a gear 27 fixed to the front end of an output shaft 26. With the construction described above, the rotating force can be transmitted between the input shaft 1 and the output shaft 26 disposed concentrically with each other.

In the case of the structure shown in FIG. 5, however, the rear end of the transmission is provided with the transmission mechanism consisting of the gears 25, 27. Therefore, a weight of the rear end portion of the transmission inevitably increases. When mounting the transmission in the automobile, the front end of this transmission is connected to the rear end of the engine. Hence, the rear end of the transmission serves as a free end. If the weight of this rear end portion increases, however, the vibrations and noises tend to undesirably augment during an operation of the engine. Besides, in the structure illustrated in FIG. 5, it is difficult to make the centers of the input disks 2, 2 and the output disks 4, 4 coincident with the centers of the power rollers 7, 7. A sufficient transmission efficiency can not be necessarily obtained.

That is, the rollers 11, 11 thrust the outer surfaces of the output disks 4, 4 upon an operation of the transmission. At this moment, the input disk 2 and the output disk 4 that are provided on the left side in FIG. 5 slightly move to the left hand in the same Figure. As a result, the centers of curvatures of the inner surfaces 2a, 4a of the two disks 2, 4 deviate from the center of curvature of the power roller 7 the peripheral surface 7a of which comes into contact with the two inner surfaces 2a, 4a. This results in a deterioration in state of the contact between the surfaces 2a, 4a, 7a. This further worsens the efficiency of transmission between the input disk 2 and the output disk 4.

Further, it is required that the input disk 2 constituting the toroidal type continuously variable transmission be impossible of relative rotations about the shaft member which supports this input disk but be so supported as to be shiftable in the axial directions. For this purpose, female splines 25 are, as illustrated in FIG. 7, formed over the entire length of the inner peripheral surface of the input disk 2 incorporated into the conventional toroidal type continuously variable transmission shown in FIG. 4.

When the female splines 25 are, as described above, formed over the entire length of the inner peripheral surface of the input disk 2, the working does not particularly become troublesome. The costs for manufacturing the input disks do not therefore increase.

On the other hand, the present inventors have devised the toroidal type continuously variable transmission (see FIG. 1 showing an embodiment of this invention) for the purpose of restraining small the vibrations and noises caused when used. In the case of this transmission, as illustrated in FIG. 8, the female splines 25 are formed not over the entire inner peripheral surface of the input disk 2 but partly in the axis direction thereof. Besides, it is required that a minor diameter R of this female spline 25 be set larger a minor diameter r (R>r) of the central hole 26 formed in the input disk 2.

The above-mentioned working of the input disk 2 shown in FIG. 8 is difficult. A problem expected is that the costs for manufacturing the input disks 2 augment if left as it is.

SUMMARY OF THE INVENTION

It is a primary object of the present invention to provide a toroidal type continuously variable transmission capable of restraining small the vibrations and noises when used by improving a weight balance in consideration of an actual incorporation thereof into an automobile.

It is another object of the present invention to provide a toroidal type continuously variable transmission capable of accomplishing the foregoing object and manufacturing disks employed at low costs.

According to one aspect of the present invention, there is provided a toroidal type continuously variable transmission comprising: a casing; a fixed partition wall provided inwardly of the casing; a through-hole formed in a part of the partition wall; an input shaft rotatably supported within the casing; a driving gear fixed to the input shaft; an output shaft disposed in parallel with the input shaft within the casing in such a state that the output shaft is inserted through a central part of the through-hole and independently rotatable with respect to the input shaft; a pair of output disks having their inner surfaces concaved in a circular arc in section and fixed at a spacing onto the periphery of the output shaft; an internal rotary cylinder rotatably supported on the periphery of the output shaft inwardly of the through-hole between the pair of output disks; a pair of input disks so supported on both ends of the internal rotary cylinder as to be only shiftable in the axial directions with respect to the internal rotary cylinder; an external rotary cylinder rotatably supported on the periphery of the internal rotary cylinder inwardly of the through-hole between the pair of input disks; a rolling bearing, provided between the external rotary cylinder and the partition wall, for retaining a thrust load and a radial load applied on the external rotary cylinder; a driven gear fixed to the outer peripheral surface of a mid-portion of the external rotary cylinder and meshing with the driving gear; a pair of cam plates so supported on both ends of the external rotary cylinder as to be only shiftable in the axial directions of the external rotary cylinder and having their one surfaces set in face-to-face relationship with the outer surfaces of the pair of input disks; cam surfaces concaved/convexed in the peripheral direction and formed on at least one side surfaces of one surfaces of the cam plates and the outer surfaces of the pair of input disks; rollers interposed by plural numbers in the radial directions between the one surfaces of the cam plates and the outer surfaces of the pair of input disks; a pair of elastic members provided between a portion fixed to the external rotary cylinder and the other surfaces of the cam plates and thrusting the cam plates toward the input disks; a plurality of trunnions swinging pivots existing in twist positions with respect to the input shaft and the output shaft; and a plurality of power rollers having spherically convexed peripheral surfaces, rotatably supported on displacement shafts retained by the trunnions and interposed between the input and output disks.

In the thus constructed toroidal type continuously variable transmission of this invention, when rotating the input shaft, the external rotary cylinder and the pair of cam plates supported on both ends of this external rotary cylinder are rotated through the driving gear and the driven gear as well. The rotations of the cam plates are transmitted via the rollers disposed by plural numbers to the pair of input disks supported on both ends of the internal rotary cylinder.

The pair of input disks are so supported on both ends of the internal rotary cylinder as to be only shiftable in the axial directions. The two input disks are therefore rotate synchronously with each other. Further, a radial load and a thrust load that are applied on the external rotary cylinder are retained by the partition wall through rolling bears. The position of this external rotary cylinder does not therefore deviate in the axial directions as well as in the diametrical direction.

Based on the action of the pressure unit including the rollers described above, the pair of input disks rotate together with the internal rotary cylinder about the output shaft while being each pressed by the plurality of power rollers. As a result, the plurality of power rollers rotate about the displacement shafts while pressing their peripheral surfaces against the inner surfaces of the input disks and the output disks. The rotations of the pair of input disks are transmitted to the pair of output disks fixed to the outer peripheral surface of the output shaft. The output shaft is thereby rotated.

The output disks remain fixed in predetermined positions on the outer peripheral surface of the output shaft but do not therefore move. Accordingly, even when pressing the pair of input disks against the output disks respectively through the plurality of power rollers, the axial position of each input disk does not deviate from a desired position. Hence, the rotating forces can be transmitted at a high efficiency between the input disks and the output disks.

When changing a transmission gear ratio between the input shaft and the output shaft, as in the case of the prior art device stated above, the trunnions are swung about the pivots. Tilt angles of the displacement shafts are thereby varied.

In the thus constructed toroidal type continuously variable transmission, the principal components such as the input and output disks, the trunnions, the power rollers can be arranged in the circumference of the output shaft. Therefore, the front end of the propeller shaft can be connected to the rear end of the output shaft through no intermediary of the gear transmission mechanism. Consequently, the weight of the rear end portion of the toroidal type continuously variable transmission does not increase. In the case of incorporating this toroidal type continuously transmission into a vehicle, the weight of the rear end defined as a free end can be restrained down to a small value. Vibrations and noises produced during the operation can be restrained small.

A disk for a toroidal type continuously variable transmission according to this invention has its inner surface concaved in a circular arc in section. The disk is formed in a circular ring-like configuration on the whole and includes female splines formed partially in the inner peripheral surface of a central hole in the axial direction. The above-mentioned disk according to the present invention comprises: an annular recessed portion formed in the side surface of a disk body concentrically with the central hole; and an annular member having a major-diametrical portion fixedly internally fittable in the annular recessed portion and its minor diameter larger than a minor diameter of the central hole. Then, the annular member is internally fitted in the annular recessed portion in such a state that the female splines are formed in the inner peripheral surface of the annular member. The disk and the annular member are thus combined. In the thus constructed disk for the toroidal type continuously variable transmission according to this invention, the female splines can be formed in some portion, having a diameter larger than that of the central hole, of the inner peripheral surface of the disk.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
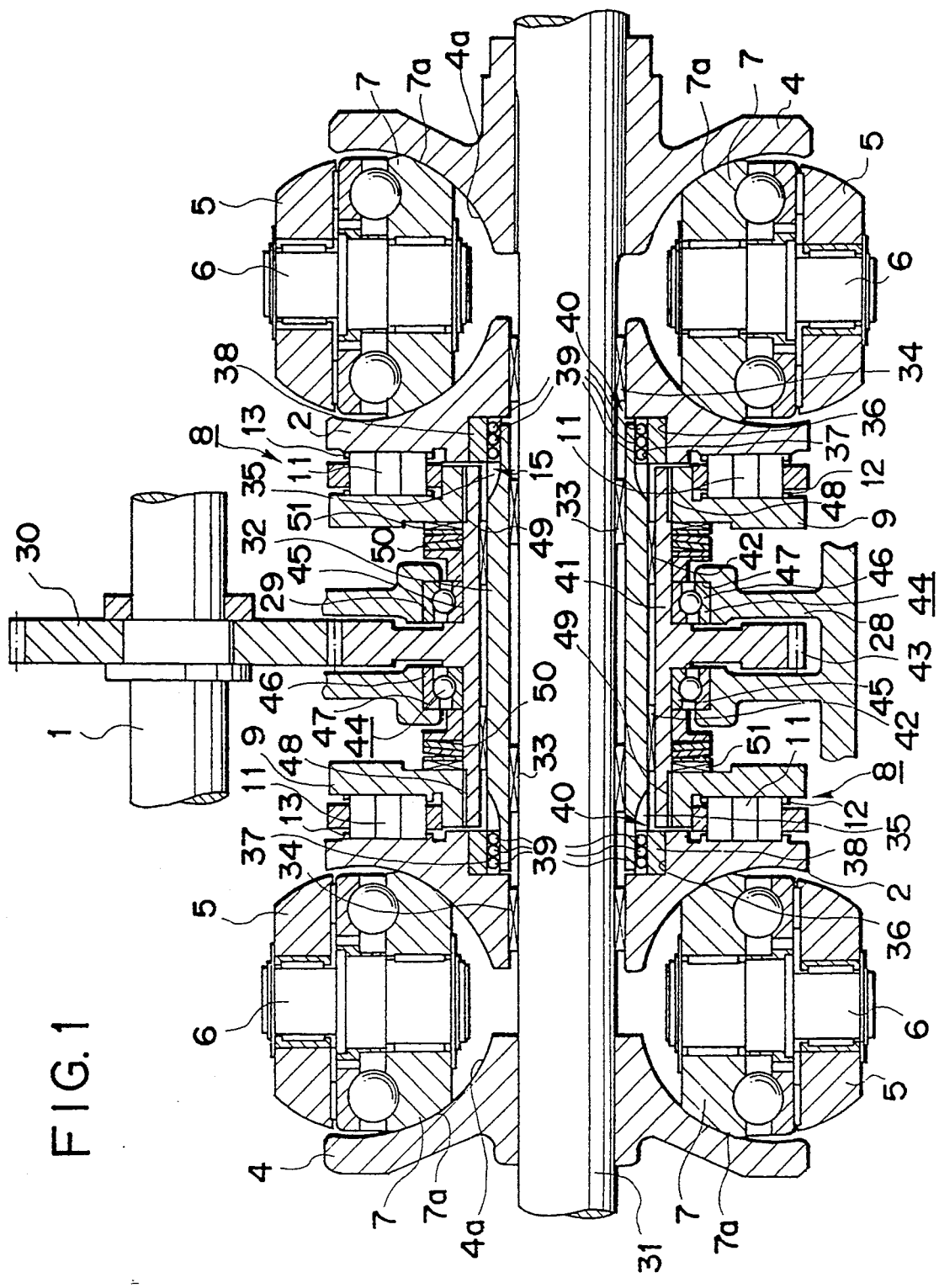
FIG. 1 is a sectional view showing an embodiment of the present invention.
Figure 2:
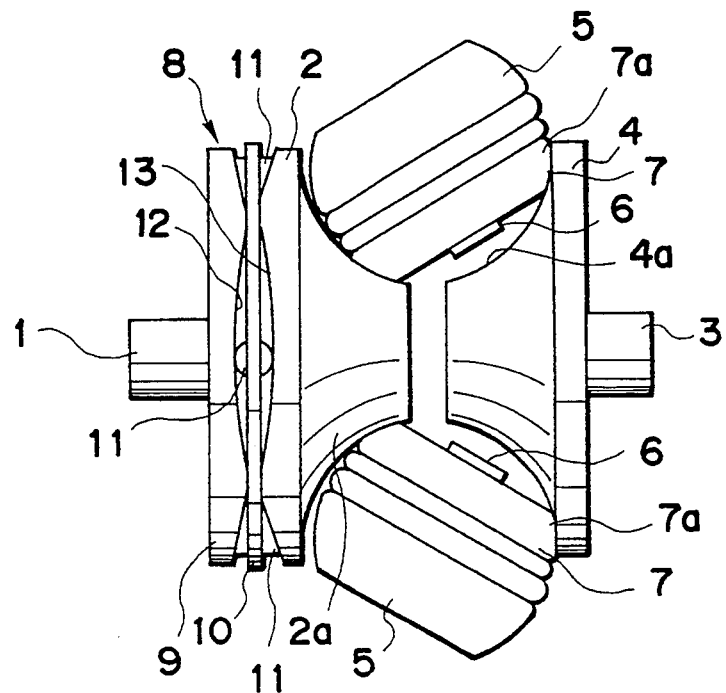
FIG. 2 is a side view illustrating a basic structure of a toroidal type continuously variable transmission during a maximum deceleration.
Figure 3:
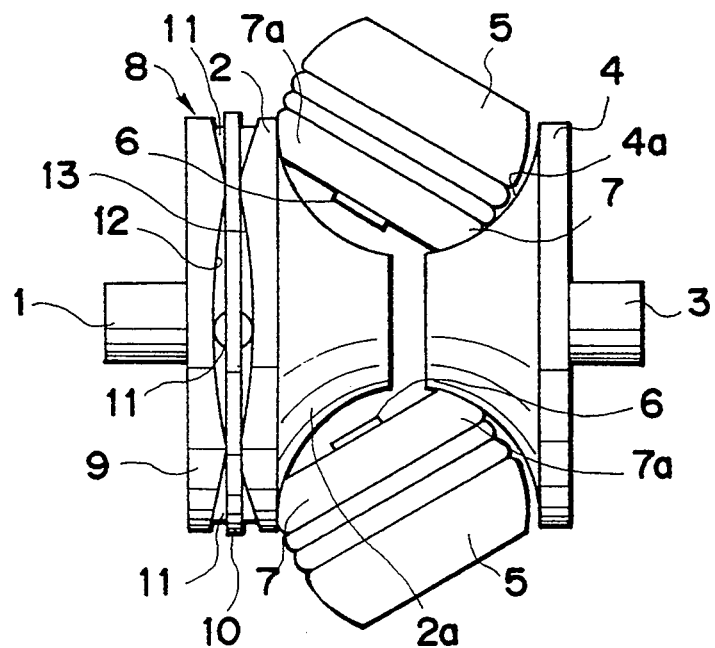
FIG. 3 is a side view showing the same structure during a maximum acceleration.
Figure 4:
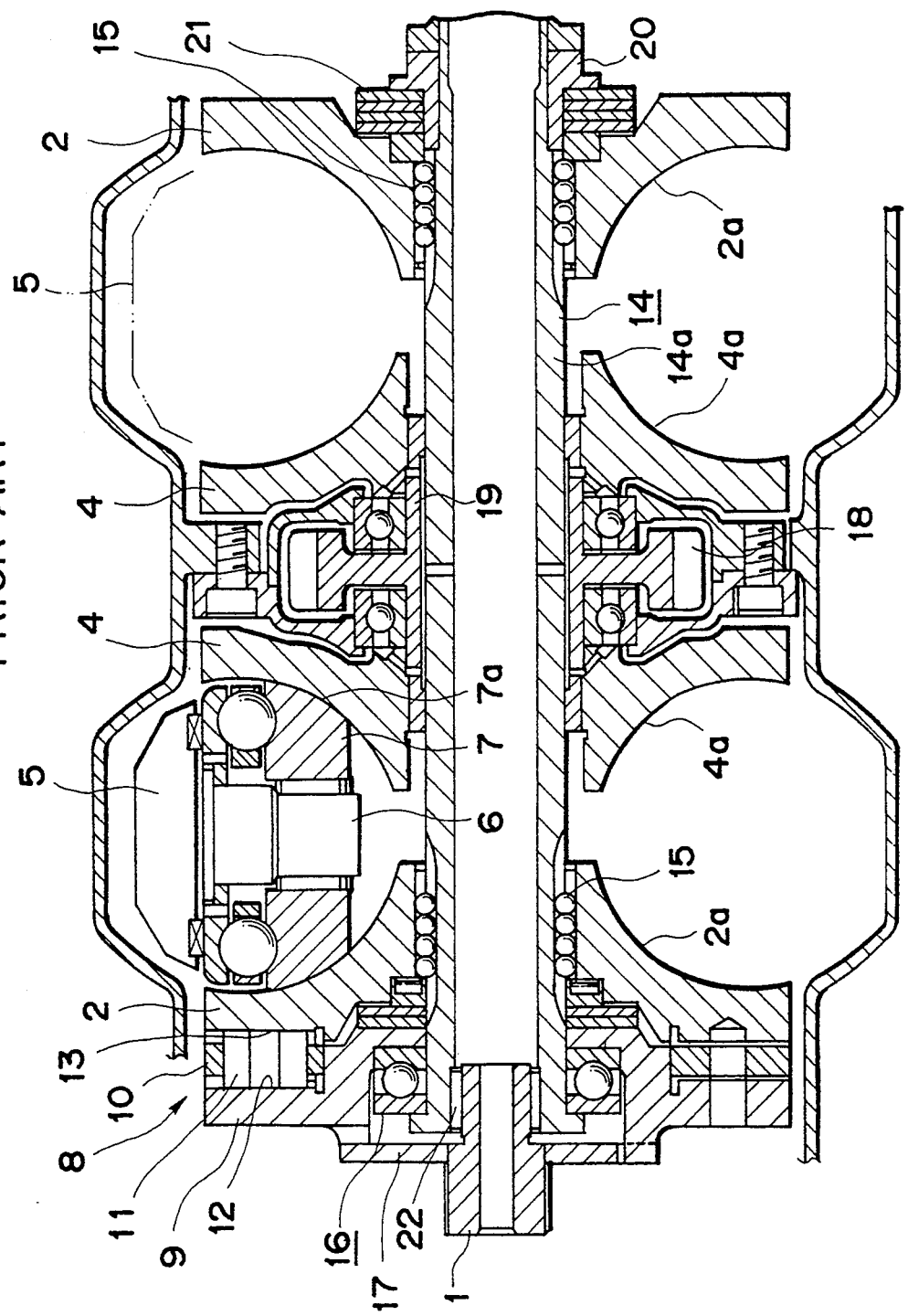
FIG. 4 is a sectional view showing a first example of a conventional structure.

FIG. 1 illustrates an embodiment of the present invention. An unillustrated casing encases components of a toroidal type continuously variable transmission. A fixed partition wall 28 is provided inwardly of the casing. In accordance with the embodiment illustrated therein, this partition wall 28 is formed as a double wall. A circular through-hole 29 is formed in a part of the partition wall 28.

On the other hand, the input shaft 1 is so supported on an unillustrated rolling bearing as to be only rotatable (impossible of shifting in the axial directions) in the casing. A driving gear 30 is fixed to a mid-portion of this input shaft 1. Further, an output shaft 31 is also so supported on an unillustrated rolling bearing in parallel with the input shaft 1 as to be only rotatable (impossible of shifting in the axial direction) in the casing. A mid-portion of this output shaft 31 passes through the central part of the through-hole 29.

A pair of output disks 4, 4 have their inner surfaces 4a, 4a each concaved in a circular arc in section in the axial directions thereof. The output disks 4, 4 spaced away from each other are fixed in two positions with the partition wall 28 being interposed therebetween at the mid-portion of the output shaft 31 in such a state that the inner surfaces 4a, 4a are disposed in a face-to-face relationship.

Besides, an internal rotary cylinder 32 is rotatably supported through a pair of needle bearings 33, 33 on the outer peripheral surface of the mid-portion of the output shaft 31 inwardly of the through-hole 29 between the pair of output disks 4, 4. Then, a pair of input disks 2, 2 are so supported on both ends of this internal rotary cylinder 32 as to be only shiftable in the axial directions (right-and-left directions in FIG. 1) with respect to the internal rotary cylinder 32.

More specifically, male splines 35, 35 are formed respectively on the outer peripheral surfaces of both ends of the internal rotary cylinder 32. On the other hand, annular members 38, 38 having their inner peripheral surfaces formed with female splines 37, 37 are fixedly internally fitted in annular recesses 36, 36 formed at the closer-to-inner-periphery end parts of the outer surfaces of the input disks 2, 2. Then, steel balls 39, 39 are interposed between the male splines 35, 35 and the female splines 37, 37. Ball splines 40, 40 are provided between both ends of the internal rotary cylinder 32 and the input disks 2, 2. Therefore, the input disks 2, 2 are smoothly shifted in the axial directions of the internal rotary cylinder 32 but do not relatively rotate with respect to the internal rotary cylinder 32. That is, the pair of input disks 2, 2 synchronously rotate through the internal rotary cylinder 32.

Further, needle bearings 34, 34 are provided between the inner peripheral surfaces of the input disks 2, 2 and the outer peripheral surface of the output shaft 31. The input disks 2, 2 and the output shaft 31 are thereby made relatively rotatable.

An external rotary cylinder 41 is rotatably supported through needle bearings 42, 42 on the periphery of the internal rotary cylinder 32. This external rotary cylinder 41 is located inwardly of the through-hole 29 between the pair of input disks 2, 2.

A driven gear 43 meshing with the driving gear 30 described above is integrally provided on the outer peripheral surface of the mid-portion of this external rotary cylinder 41. This driven gear 43 is rotatable inwardly of the partition wall formed as the double wall. Inner rings 45, 45 constituting angular contact ball bearings 44, 44 are fixedly externally fitted to the outer peripheral surface of the external rotary cylinder 41 in positions between which the driven gear 43 is middled. Further, outer rings 46, 46 constituting ball bearings 44, 44 are fixedly fitted to engagement stepped portions 47, 47 formed in the inner peripheral edges of the through-hole 29. As a result, a radial load and a thrust load acting on the external rotary cylinder 41 are retained by the pair of ball bearings 44, 44.

A pair of cam plates 9, 9 are so supported on both ends of the external rotary cylinder 41 as to be only shiftable in the axial directions of this external rotary cylinder 41. To be specific, male splines 48, 48 formed on the outer peripheral surfaces of both ends of the external rotary cylinder 41 engage with female splines 49, 49 formed in the inner peripheral surfaces of the cam plates 9, 9. Consequently, the cam plates 9, 9 shift in the axial directions of the external rotary cylinder 41 but do not relatively rotate with respect to the external rotary cylinder 41. Namely, the pair of cam plates 9, 9 synchronously rotate through the external rotary cylinder 41.

Further, cam surfaces 12, 13 concaved and convexed in their peripheral directions are formed on one surfaces of the cam plates 9, 9 and on the outer surfaces of the pair of input disks 2, 2. At the same time, rollers 11, 11 are disposed by plural numbers in the radial directions between these two cam surfaces 12, 13. A pressure unit 8 is thus constructed. Moreover, a pair of flat plate springs 50, 50 serving as elastic members and a pair of thrust needle bearings 51, 51 are provided between the inner rings 45, 45 fixedly externally fitted to the external rotary cylinder 41 and the other surfaces of the cam plates 9, 9. One surfaces of the cam plates 9, 9 are pressed against the outer surfaces of the input disks 2, 2.

Further, a plurality of trunnions 5, 5 swing about pivots (unillustrated) existing in twist positions with respect to the input shaft 1 and the output shaft 3. The trunnions 5, 5 are provided between the pairs of input disks 2, 2 and output disks 4, 4 on the periphery of the output shaft 31. Then, the plurality of power rollers 7, 7 having the spherically convexed peripheral surfaces 7a are rotatably supported on displacement shafts 6, 6 retained by the trunnions 5, 5. At the same time, the power rollers 7, 7 are interposed between the input and output disks 2, 4.

In the case of the thus constructed toroidal type continuously variable transmission according to this invention, when rotating the input shaft 1, the external rotary cylinder 41 and the pair of cam plates 9, 9 supported on both ends of the external rotary cylinder 41 are rotated through the driving gear 30 and the driven gear 43 as well. The rotations of the cam plates 9, 9 are transmitted to the pair of input disks 2, 2 supported on both ends of the internal rotary cylinder 32 respectively through the plurality of rollers 11, 11. The pair of input disks 2, 2 are so supported on both ends of the internal rotary cylinder 32 as to be only shiftable in the axial directions. The two input disks 2, 2 therefore rotate in synchronization with each other.

Note that the external rotary cylinder 41 is sustained by the partition wall 28 through the pair of ball bearings 44, 44. The driving gear 30 and the driven gear 43 therefore involve the use of helical gears. With this arrangement, even when a force acting in the axial direction is applied on the external rotary cylinder 41, the external rotary cylinder 41 does not deviate in the axial direction. Hence, the rotating forces are transmitted from the pair of cam plates 9, 9 to the pair of input disks 2, 2 under the same conditions. No large torsional stress is applied on the internal rotary cylinder 32 on the basis of a difference between the rotating forces transmitted to the two input disks 2, 2.

As described above, the input disks 2, 2 are rotated about the output shaft 31 together with the internal rotary cylinder 32. The input disks 2, 2 are rotated while being pressed by the plurality of power rollers 7, 7 by dint of the action of the pressure units 8, 8 including the plurality of rollers 11, 11. As a result, the plurality of power rollers 7, 7 rotate about the displacement shafts 6, 6 while their peripheral surfaces 7a, 7a are pressed against the inner surfaces 2a, 4a of the input disks 2, 2 and of the output disks 4, 4. In consequence, the rotations of the pair of input disks 2, 2 are transmitted to the pair of output disks 4, 4 fixed to the outer peripheral surface of the output shaft 31, thereby rotating the output shaft 31.

The output disks 4, 4 remain fixed in predetermined positions on the outer peripheral surface of the output shaft 31 but do not therefore move. Even when the pair of input disks 2, 2 are respectively thrust against the output disks 4, 4 through the plurality of power rollers 7, 7, the axial positions of the input disks 2, 2 do not deviate from the desired positions. Hence, the rotating forces can be always transmitted at a high efficiency between the input disks 2, 2 and the output disks 4, 4.

When changing a transmission gear ratio between the input shaft 1 and the output shaft 31, as in the case of the prior art device discussed above, the trunnions 5, 5 are swung about the pivots. Tilt angles of the displacement shafts 6, 6 are thereby varied to change the positions of contacts between the peripheral surfaces 7a, 7a of the power rollers 7, 7 pivotally supported on the displacement shafts 6, 6 and the inner surfaces 2a, 4a of the input disks 2, 2 and of the output disks 4, 4.

Figure 5:
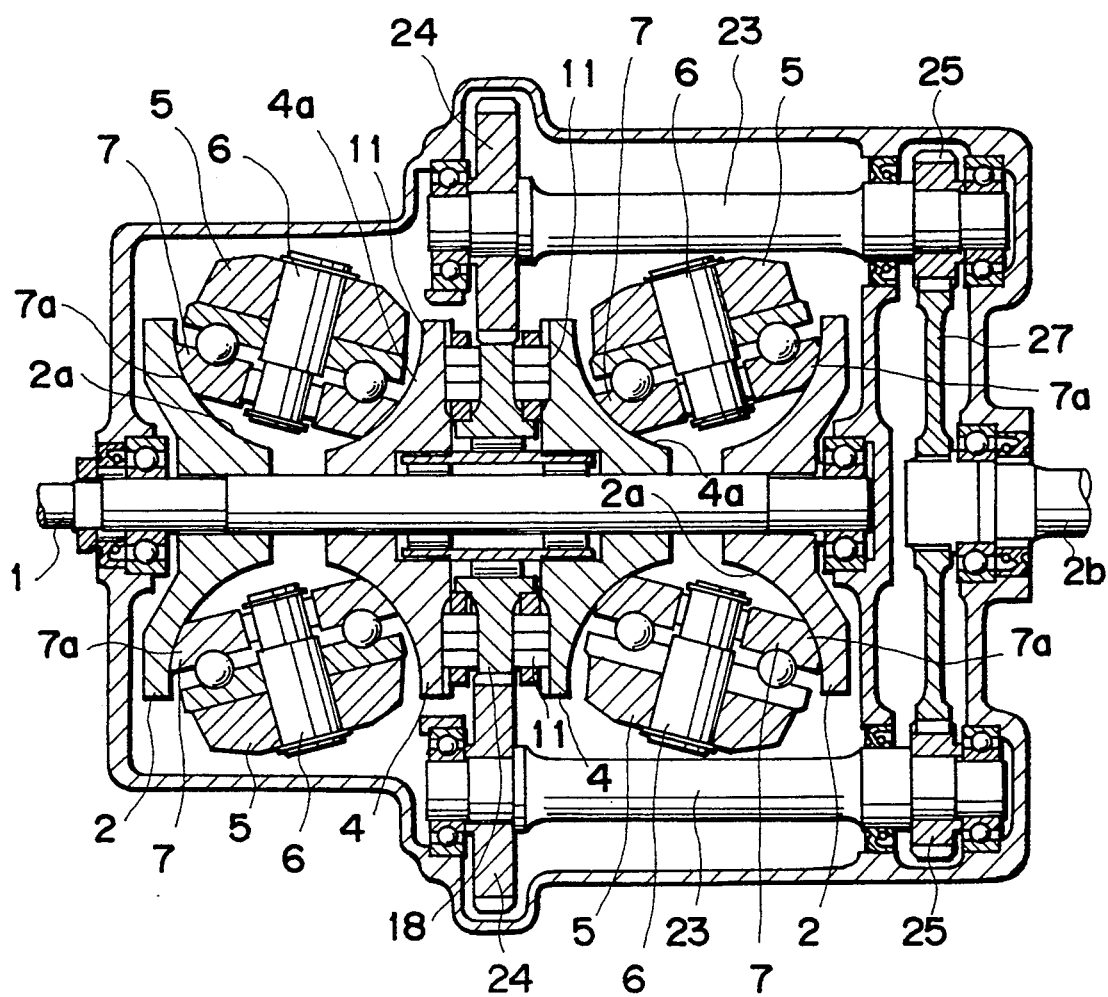
FIG. 5 is a sectional view showing a second example of the same structure.

In the case of the thus constructed toroidal type continuously variable transmission according to the present invention, the principal components such as the input and output disks 2, 4, the trunnions 5, 5, the power rollers 7, 7 can be arranged in the circumference of the periphery of the output shaft 31. Therefore, as in the conventional structure illustrated in FIG. 5, a front end of a propeller shaft can be connected to a rear end of the output shaft 31 through no intermediary of a gear transmission mechanism. Consequently, the weight of the rear end portion of the toroidal type continuously variable transmission does not increase. In the case of incorporating this toroidal type continuously variable transmission into a vehicle, the weight of the rear end defined as a free end can be restrained down to a small value. Vibrations and noises produced during the operation can be restrained small.

Namely, where an automobile transmission is constructed by utilizing the toroidal type continuously variable transmission of this invention, the output shaft 31 is disposed on the line through which a crankshaft of the engine is connected to the propeller shaft constituting a driving system. As a result, the input shaft 1 deviates sideway from the line of extension of the crankshaft. Therefore, the rotating force of the crankshaft is transmitted to the input shaft 1 by means of the gear transmission mechanism provided at the front end of the toroidal type continuously variable transmission, i.e., in the vicinity of the connecting portion between the engine and the transmission.

Even if the weight of the front end portion vicinal to the connecting portion between the engine and the transmission increases to some extent, there is no possibility in which the transmission largely vibrates or produces the noises during the operation of the engine.

The toroidal type continuously variable transmission according to the present invention is constructed and acts as described above. It is therefore possible to obtain the practical automobile transmission in which the vibrations and noises caused during the operation are restrained small.

Next, another embodiment of this invention will be described with reference to FIG. 6. Note that the repetitive explanation of the same portions as those in the embodiment discussed above will be omitted.

Figure 6:
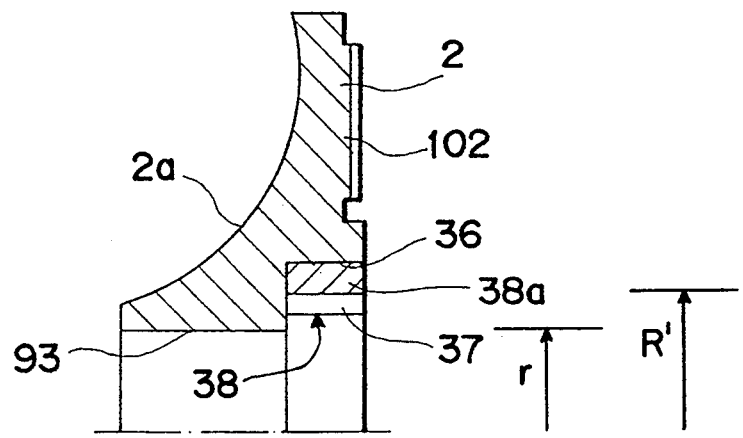
FIG. 6 is a sectional view of a half portion, showing an embodiment where the present invention is applied to an input disk.
Figure 7:
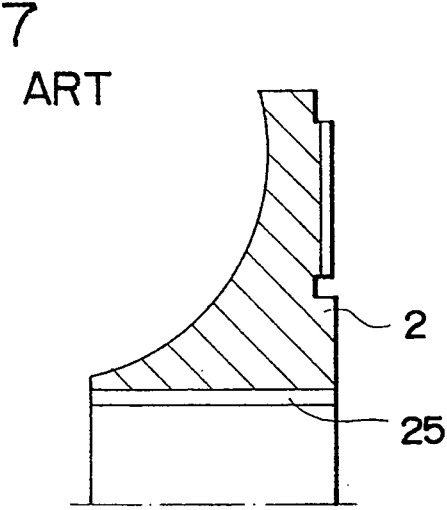
FIG. 7 is a sectional view of a half portion of a conventional input disk.

Paying attention to FIG. 6, the input disks 2, 2 are each constructed of a combination of a disk body 102 and an annular member 38. A central part of the side surface of the disk body 102 of those components includes an annular recessed part 36 formed along its entire periphery and concentric with a central hole 93 through which the output shaft 31 is inserted into the disk body 102. On the other hand, the annular member 38 has a major-diametrical portion 38a fixedly internally fittable in the annular recessed portion 36. The annular member 38 also has a minor diameter R' larger than a minor diameter r of the central hole 93. The above-mentioned female spline 37 is formed in advance of fixedly internally fitting in this annular member 38 in the annular recessed portion 36. Then, the annular member 38 having its inner peripheral surface formed with the female spline 37 is fixedly internally fitted in the annular recessed portion 36, thereby combining the disk body 102 with the annular member 38. The input disk 2 is thus constructed.

Some portions of the input disks 2, 2 constructed as described above are put on both ends of the internal rotary cylinder 32. In this state, ball splines 15, 15 are provided between both ends of the internal rotary cylinder 32 and the input disks 2, 2 by interposing balls 39, 39 between the male splines 35, 35 and the female splines 37, 37. Hence, the input disks 2, 2 smoothly shift in the axial directions of the internal rotary cylinder 32 but do not relatively rotate with respect to the internal rotary cylinder 32. That is, the pair of input disks 2, 2 synchronously rotate through the internal rotary cylinder 32.

The toroidal type continuously variable transmission of this invention is constructed and acts as explained above. The same transmission can be therefore manufactured at low costs without requiring troublesome working. Nevertheless, it is possible to obtain the toroidal type continuously variable transmission capable of restraining small the noises and vibrations produced during the operation.

Figure 8:
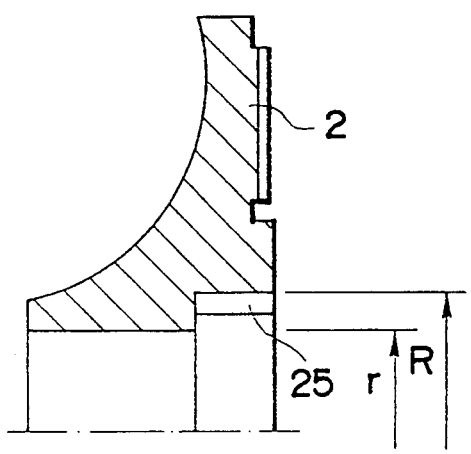
FIG. 8 is a sectional view of a half portion of the input disk defined as a prerequisite to the present invention.

Note that the description given above has dealt with the example where the present invention is applied to the input disks. However, the present invention is, as a matter of course, applicable to the output disks if there arises the necessity for configuring the output disks as shown in FIGS. 6 and 8 due to a change in terms of structure of the toroidal type continuously variable transmission.

It is apparent that, in this invention, a wide range of different working modes can be formed based on the invention without deviating from the spirit and scope of the invention. This invention is not restricted by its specific working modes except being limited by the appended claims.

What is claimed is:

1. A toroidal type continuously variable transmission comprising:
   a casing;
   a fixed partition wall provided inwardly of said casing;
   a through-hole formed in a part of said partition wall;
   an input shaft rotatably supported within said casing;
   a driving gear fixed to said input shaft;
   an output shaft disposed in parallel with said input shaft within said casing in such a state that said output shaft is inserted through a central part of said through-hole and independently rotatable with respect to said input shaft;
   a pair of output disks having their inner surfaces concaved in a circular arc in section and fixed at a spacing onto the periphery of said output shaft;
   an internal rotary cylinder rotatably supported on the periphery of said output shaft inwardly of said through-hole between said pair of output disks;
   a pair of input disks so supported on both ends of said internal rotary cylinder as to be only shiftable in the axial directions with respect to said internal rotary cylinder;
   an external rotary cylinder rotatably supported on the periphery of said internal rotary cylinder inwardly of said through-hole between said pair of input disks;
   a rolling bearing, provided between said external rotary cylinder and said partition wall, for retaining a thrust load and a radial load applied on said external rotary cylinder;
   a driven gear fixed to the outer peripheral surface of a mid-portion of said external rotary cylinder and meshing with said driving gear;
   a pair of cam plates so supported on both ends of said external rotary cylinder as to be only shiftable in the axial directions of said external rotary cylinder and having their one surfaces set in face-to-face relationship with the outer surfaces of said pair of input disks;
   cam surfaces concaved/convexed in the peripheral direction and formed on at least one side surfaces of one surfaces of said cam plates and the outer surfaces of said pair of input disks;
   rollers interposed by plural numbers in the radial directions between said one surfaces of said cam plates and said outer surfaces of said pair of input disks;
   a pair of elastic members provided between a portion fixed to said external rotary cylinder and the other surfaces of said cam plates and thrusting said cam plates toward said input disks;
   a plurality of trunnions swinging pivots existing in twist positions with respect to said input shaft and said output shaft; and
   a plurality of power rollers having spherically convexed peripheral surfaces, rotatably supported on displacement shafts retained by said trunnions and interposed between said input and output disks.

2. A disk, for a toroidal type continuously variable transmission, having its inner surface concaved in a circular arc in section, formed in a circular ring-like configuration on the whole and including female splines formed partially in the inner peripheral surface of a central hole in the axial direction,
   said disk comprising:
   an annular recessed portion formed in the side surface of a disk body concentrically with said central hole; and
   an annular member having a major-diametrical portion fixedly internally fittable in said annular recessed portion and its minor diameter larger than a minor diameter of said central hole, wherein said annular member is internally fitted in said annular recessed portion in such a state that said female splines are formed in the inner peripheral surface of said annular member, and said disk and said annular member are thus combined.

* * * * *